(12) United States Patent
Huang

(10) Patent No.: US 11,303,596 B2
(45) Date of Patent: Apr. 12, 2022

(54) METHOD AND A DEVICE FOR PROCESSING INFORMATION

(71) Applicant: SHANGHAI ZHANGMEN SCIENCE AND TECHNOLOGY CO., LTD., Shanghai (CN)

(72) Inventor: Yongsheng Huang, Shanghai (CN)

(73) Assignee: SHANGHAI ZHANGMEN SCIENCE AND TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/916,181

(22) Filed: Jun. 30, 2020

(65) Prior Publication Data

US 2021/0112027 A1 Apr. 15, 2021

(30) Foreign Application Priority Data

Apr. 30, 2019 (CN) .......................... 201910363696.7

(51) Int. Cl.

| | |
|---|---|
| *H04L 12/00* | (2006.01) |
| *H04L 51/18* | (2022.01) |
| *G06F 9/451* | (2018.01) |
| *G06F 3/0482* | (2013.01) |
| *H04L 51/046* | (2022.01) |
| *H04L 67/01* | (2022.01) |

(52) U.S. Cl.
CPC ............ *H04L 51/18* (2013.01); *G06F 3/0482* (2013.01); *G06F 9/451* (2018.02); *H04L 51/046* (2013.01); *H04L 67/42* (2013.01)

(58) Field of Classification Search
CPC . H04L 12/1822; H04L 12/66; H04L 12/1827; H04L 65/60; H04L 12/1818; H04L 65/1006; H04N 21/4318; H04N 21/42204; H04W 28/0268; G01N 33/48735
USPC .................................................. 709/206–207
See application file for complete search history.

(56) References Cited

U.S. PATENT DOCUMENTS

| | | | |
|---|---|---|---|
| 7,987,275 B2 * | 7/2011 | Shae ................... | H04L 12/1818 709/227 |
| 10,404,636 B2 * | 9/2019 | Rodriguez .............. | H04L 65/60 |

(Continued)

FOREIGN PATENT DOCUMENTS

WO WO-2007118514 A1 * 10/2007 ......... H04L 12/1822

*Primary Examiner* — Frantz Coby
(74) *Attorney, Agent, or Firm* — Kilpatrick Townsend & Stockton LLP

(57) ABSTRACT

An embodiment of the present disclosure discloses a method, which comprises: in response to detecting an operation of triggering a hosted application in a hosted application set of a target chat session of a host application by a user in the target chat session through an interface of the target chat session, generating a chat message based on identification information of the triggered hosted application; sending the generated chat message to a server, so that the server sends the chat message to at least one user in the target chat session, and the chat message can be triggered to initiate the triggered hosted application; and displaying the chat message on the interface of the target chat session. This embodiment enables the hosted application to be used as a functional control of the target chat session, which facilitates operating the hosted application in a user group at a client.

18 Claims, 9 Drawing Sheets

(56) References Cited

U.S. PATENT DOCUMENTS

| | | | |
|---|---|---|---|
| 2008/0147803 A1* | 6/2008 | Krzyzanowski | ............................ H04N 21/42204 709/206 |
| 2010/0205544 A1* | 8/2010 | Brzeski | ................... H04L 12/66 715/758 |
| 2011/0055735 A1* | 3/2011 | Wood | ................... H04L 12/1827 715/758 |
| 2012/0077258 A1* | 3/2012 | Fortsch | ............ G01N 33/48735 435/287.1 |
| 2012/0131204 A1* | 5/2012 | Song | ................... H04L 12/1822 709/227 |
| 2014/0372540 A1* | 12/2014 | Libin | ................... H04L 12/1822 709/206 |
| 2017/0180782 A1* | 6/2017 | Li | ....................... H04N 21/4318 |
| 2019/0254118 A1* | 8/2019 | Dao | ..................... H04L 12/1407 |
| 2019/0387031 A1* | 12/2019 | Steinbach | ........... H04L 65/1006 |

* cited by examiner

METHOD AND A DEVICE FOR PROCESSING INFORMATION

CROSS-REFERENCE TO RELATED APPLICATIONS

This application claims priority to Chinese Patent Application No. 201910363696.7, filed on Apr. 30, 2019, the entire contents of which are incorporated herein by reference.

FIELD

Embodiments of the present disclosure relates to computer technologies, and more In one embodiment relates to a method and a device for processing information.

BACKGROUND

A hosted application usually refers to an application program that runs with dependence on a host application. An application program generally refers to a computer program that is designed to accomplish one or more specified tasks. It runs in a user mode, can interact with users, and has a visible user interface.

At present, when a user needs to initiate a hosted application for use, the user is required to go into a page related to hosted applications which is In one embodiment set by a host application, such as a listing page of hosted applications or a displaying page of hosted application icons or the like, to initiate the hosted application at the user's client, and separately invoke the hosted application independently of other functions.

SUMMARY

The embodiments of the present disclosure provide a method and a device for processing information.

In one embodiment of the present disclosure provides a method, implemented at a client, for processing information. The method comprises: in response to detecting an operation of triggering a hosted application in a hosted application set of a target chat session of a host application by a user in the target chat session through an interface of the target chat session, generating a chat message based on identification information of the triggered hosted application; sending the generated chat message to a server, so that the server sends the chat message to at least one user in the target chat session, and the chat message is operable to be triggered to initiate the triggered hosted application, and the hosted application runs with dependence on the host application; and displaying the chat message on the interface of the target chat session.

In another embodiment of the present disclosure provides a method, implemented at a server, for processing information. The method comprises: in response to receiving a chat message sent by a client of a user in a target chat session of a host application served by the server, sending the chat message to at least one user in the target chat session, and the chat message is generated by the client of the user based on identification information of a hosted application in a hosted application set of the target chat session which is triggered by the user through an interface of the target chat session, and the chat message is operable to initiate the hosted application.

In yet another embodiment of the present disclosure provides an electronic device. The electronic device comprises: one or more processors; a storage device having one or more programs stored thereon; and the one or more programs, when executed by the one or more processors, cause the one or more processors to implement the method as implemented in any possible manner in the one embodiment.

In still another embodiment of the present disclosure provides a computer readable medium having computer programs stored thereon, and the programs, when executed by a processor, implement the method as implemented in any possible manner in the embodiments or the method as implemented in any possible manner in the some embodiments.

Embodiments of the present disclosure provide solutions for processing information. At first, if an operation of triggering a hosted application in a hosted application set of a target chat session of a host application by a user in the target chat session through an interface of the target chat session is detected, a chat message is generated based on identification information of the triggered hosted application. Afterwards, the generated chat message is sent to a server, so that the server sends the chat message to at least one user in the target chat session. The chat message is operable to be triggered to initiate the triggered hosted application. The hosted application runs with dependence on the host application. Then, the chat message may be displayed on the interface of the target chat session. The user in the target chat session triggers the hosted application in the hosted application set of the target chat session. Then a client generates the chat message based on the identification information of the triggered hosted application, and displays the chat message on the interface of the target chat session. Also, the client may send the chat message to the server, so that the server sends the chat message to user(s) in the target chat session, and thus the user(s) in the target chat session are able to see the chat message. This enables the hosted application to be used as a functional control of the target chat session, which facilitates operating the hosted application through the target chat session of the host application. In addition, the generated chat information may be targeted for the target chat session from which the chat message originates (that is, users of other chat sessions are unable to operate the hosted application by triggering the chat message).

BRIEF DESCRIPTION OF DRAWINGS

Embodiments of the disclosure are shown with reference to the following drawings.

DESCRIPTION OF EMBODIMENTS

Figure 1:
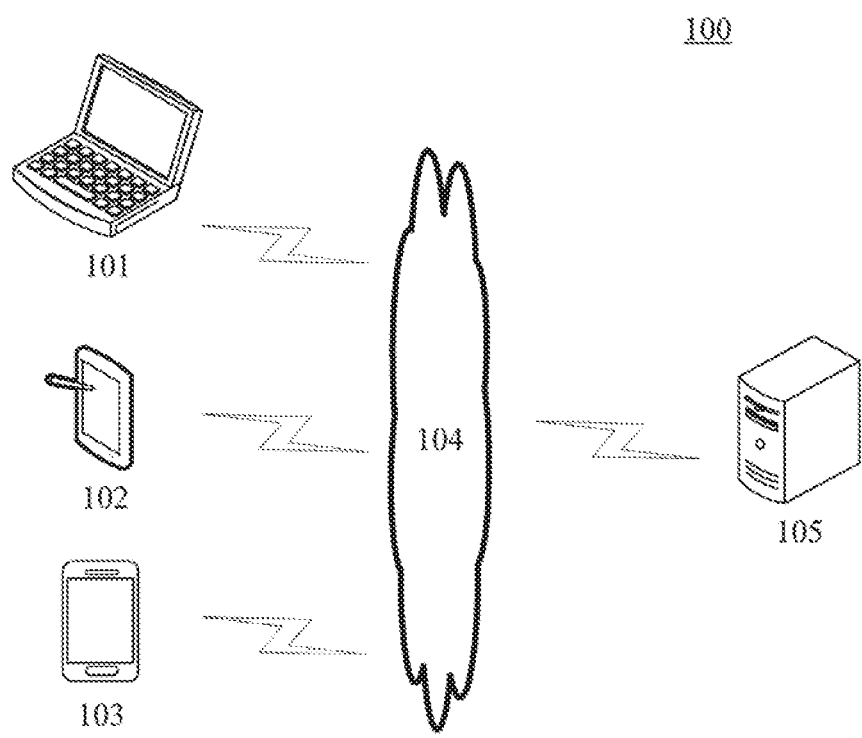
FIG. 1 is a diagram of an exemplary system architecture in which some embodiments of the present disclosure may be applied.

The following describes the present disclosure in further detail with reference to the accompanying drawings and embodiments. It can be understood that the specific embodiments described herein are only used to explain the related disclosure, but not to limit the disclosure. It should also be noted that, for convenience of description, only the parts related to the related disclosure are shown in the drawings.

It should be noted that the embodiments in the present disclosure and the features in the embodiments can be combined with each other without conflict. The present disclosure will be described in detail below with reference to the drawings and in connection with the embodiments.

FIG. 1 shows an exemplary architecture 100 to which an embodiment of a method for processing information of the present disclosure may be applied.

As shown in FIG. 1, a system architecture 100 may include terminal devices 101, 102, and 103, a network 104, and a server 105. The network 104 is a medium for providing a communication link between the terminal devices 101, 102, 103 and the server 105. The network 104 may include various connection types, such as wired, wireless communication links, or fiber optic cables, among others.

The terminal devices 101, 102, 103 interact with the server 105 through the network 104 to receive or send messages and the like. Various communication client applications may be installed on the terminal devices 101, 102, and 103, such as web browser applications, instant messaging tools, email clients, social platform software, traffic information applications, browser applications, and reading applications, etc.

The terminal devices 101, 102, and 103 may be hardware, or may be software. When the terminal devices 101, 102, and 103 are hardware, they may be various electronic devices that have a display and support communication with the server, including but not limited to: smart phones, tablets, E-book readers, MP3 (Moving Picture Experts Group Audio Layer III) players, MP4 (Moving Picture Experts Group Audio Layer IV) players, laptops and desktop computers, etc. When the terminal devices 101, 102, and 103 are software, they may be installed in the electronic devices listed above. The terminal devices 101, 102, and 103 may be implemented as multiple software or software modules (such as software or software modules for providing distributed services), or as a single software or software module. No specific limitation is made herein.

The server 105 may be a server that provides various services, such as a background server that provides support for chat messages sent by the terminal devices 101, 102, and 103. The background server may analyze and process the received chat messages, and feedback a processing result of the information to the terminal devices.

The server may be hardware, or may be software. When the server is hardware, it may be implemented as a distributed server cluster composed of multiple servers, or as a single server. When the server is software, it may be implemented as multiple software or software modules (such as software or software modules for providing distributed services), or as a single software or software module. No specific limitation is made herein.

It should be noted that the method for processing information provided in the embodiments of the present disclosure is generally performed by the terminal devices. Accordingly, the apparatus for processing information is generally provided in the terminal devices.

It should be understood that the number of the terminal devices, networks, and servers in FIG. 1 is merely exemplary. Depending on the implementation needs, there can be any number of terminal devices, networks, and servers.

Figure 2:
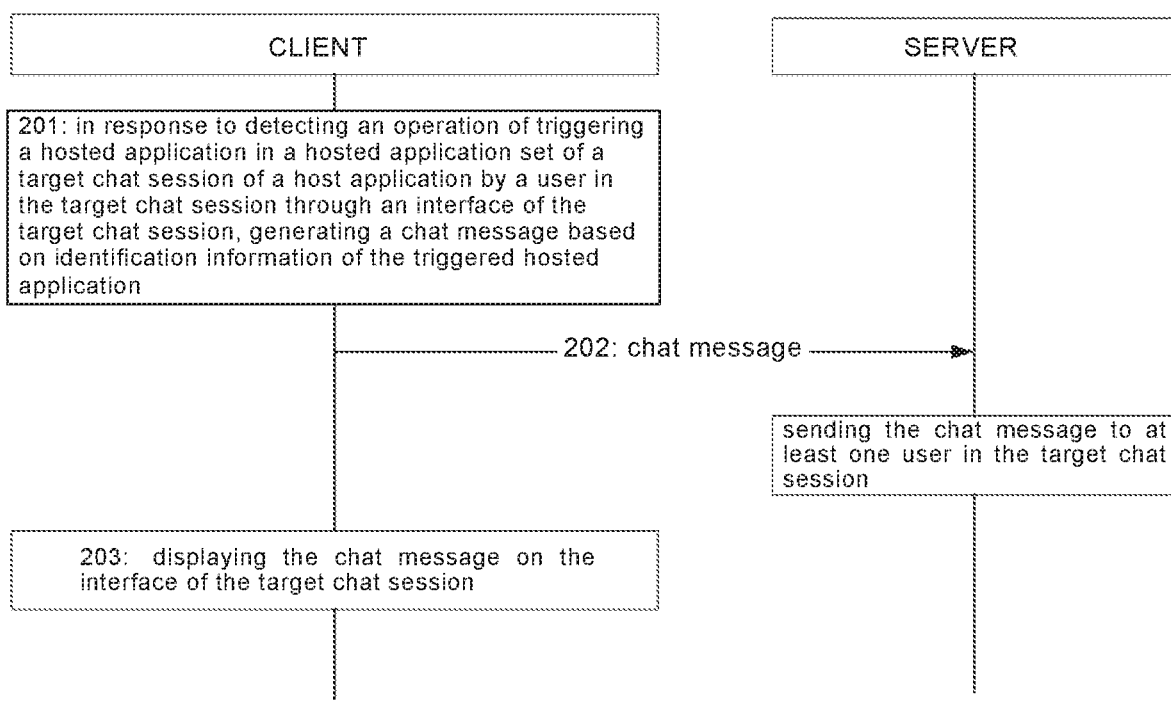
FIG. 2 is a flowchart of an embodiment of a method for processing information according to the present disclosure.

With continued reference to FIG. 2, a flow 200 of an embodiment of a method for processing information according to the present disclosure is shown. The method for processing information is implemented at a client. The client may be installed on the terminal devices 101, 102, and 103 as shown in FIG. 1. The method for processing information comprises the following steps.

Step 201, in response to detecting an operation of triggering a hosted application in a hosted application set of a target chat session of a host application by a user in the target chat session through an interface of the target chat session, a chat message is generated based on identification information of the triggered hosted application.

In this embodiment, if an operation of triggering a hosted application in a hosted application set of a target chat session of a host application by a user in the target chat session through an interface of the target chat session is detected, an entity performing the method for processing information (e.g., the terminal devices shown in FIG. 1) may generate a chat message in connection identification information of the triggered hosted application.

The host application used herein may be an instant chat software, which invokes a hosted application. The hosted application used herein may be a hosted application for registration or a hosted application for voting. As an example, the hosted application is, for example, a registration applet, a voting applet, a ticketing applet, a game applet or the like, which is hosted in the instant chat software.

There is a hosted application set on an interface of a target chat session of a host application. The hosted application set may comprise multiple hosted applications. The hosted applications may be presented in the hosted application set as their identification information.

Identification information of a hosted application may be a preset identification image of the hosted application, QR code information of the hosted application, or link information of the hosted application. This embodiment is not limited thereto.

As an example, if a hosted application in a hosted application set of a target chat session is presented as an identification image of the hosted application, then when a user in the target chat session wants to use a hosted application, the user may initiate the hosted application by triggering the identification image of the hosted application on the interface of the target chat session. It should be noted that the identification image of the hosted application may comprise link information of the hosted application. In this way, if a user clicks the identification image of the hosted application, a client of the host application may jump to the interface of the hosted application through the link information.

For example, the target chat session of the host application may be a target WeChat group. The identification image of the hosted application is displayed on a message input toolbar in the target WeChat group. If a user in the target WeChat group who is able to see the identification image of the hosted application (may be the group owner or may be each of the users in the target WeChat group) clicks the identification image of the hosted application, the WeChat client may send the identification image of the hosted application as a chat message, or generate a chat message which contains a link to the hosted application.

In some implementations of this embodiment, if an operation of triggering a hosted application in a hosted application set of a target chat session of a host application by a user in the target chat session through an interface of the target chat session is detected, the above entity performing the method may initiate the hosted application triggered by the user. Then information which is input by the user through an interface of the initiated hosted application is obtained. Afterwards, the above entity performing the method may generate a chat message in connection with the inputted information and identification information of the triggered hosted application. Here, the chat message comprises the identification information of the triggered hosted application.

The information which is input by the user may be setting information for setting the hosted application, or other information that is input. This embodiment is not limited thereto.

As an example, if a user in the target chat session clicks an identification image of a hosted application in the hosted application set of the target chat session, then the client may initiate the triggered hosted application. That is, the page jumps to a running interface of the triggered hosted application at this time. Afterwards, the user may input information on the interface of the hosted application. The client of the host application may obtain the information which is input by the user on the interface of the hosted application. Then, the client of the host application may display the information which is input by the user above the identification image of the hosted application as a chat message, or in other forms. This embodiment is not limited thereto.

In some implementations of this embodiment, if an operation of triggering a hosted application in a hosted application set of a target chat session of a host application by a user in the target chat session through an interface of the target chat session is detected, the above entity performing the method may generate a chat message in connection with identification information of the triggered hosted application and session identification information of the target chat session. For example, if a user in the target chat session clicks an identification image of a hosted application in the hosted application set of the target chat session, then the client encodes the identification image of the hosted application together with a group account of the target chat session to generate the chat message. The chat message used herein may comprise the identification information of the triggered hosted application and the session identification information of the target chat session. For example, the chat message may comprise the identification image of the hosted application and the group account of the target chat session.

It should be noted that the user used herein may be the group owner or a general group member of the target chat session. This embodiment is not limited thereto.

Step 202, the generated chat message is sent to a server, so that the server sends the chat message to at least one user in the target chat session.

In this embodiment, after the chat message is generated, the above entity performing the method may send the generated chat message to a server. The server may send the chat message to at least one user in the target chat session after receiving the chat message. The chat message is operable to be triggered to initiate the triggered hosted application. The hosted application runs with dependence on the host application.

As an example, after the client of the host application sending the generated chat message to the server, the server may send the chat message to all users in the target chat session. In this way, all users in the target chat session are enabled to receive the chat message.

Step 203, the chat message is displayed on the interface of the target chat session.

In this embodiment, if a chat message has been generated, the above entity performing the method may display the chat message on the interface of the target chat session of the host application. If the server sends the chat message to all users in the target chat session, then all users in the target chat session may be able to see the chat message comprising identification information of the hosted application.

The interface for displaying the chat message may be an information display interface in the target chat session for displaying chat messages sent by all session members in the target chat session.

Figure 3A:
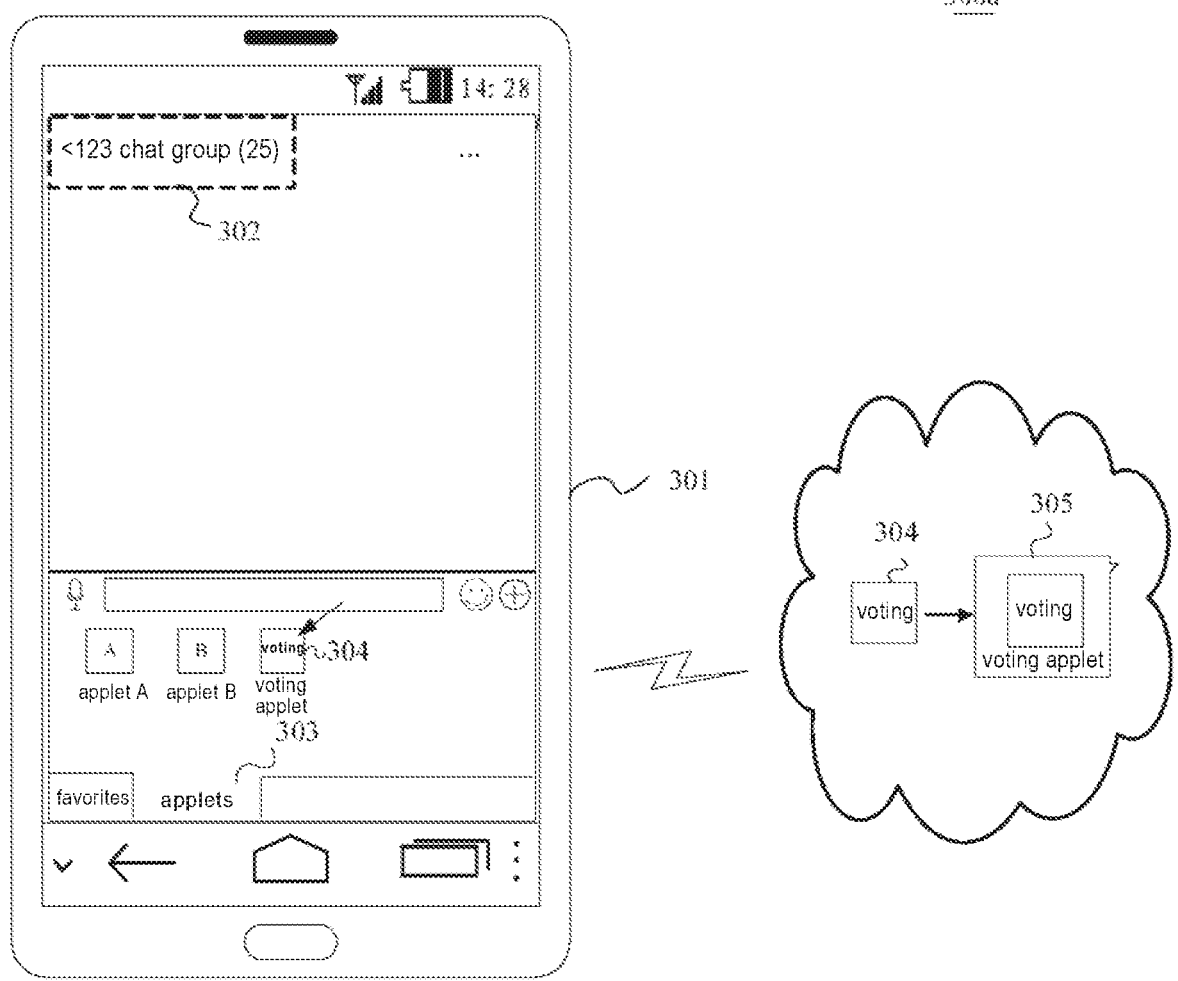
FIG. 3a is Schematic Diagram One of an application scenario of a method for processing information according to an embodiment of the present disclosure.
Figure 3B:
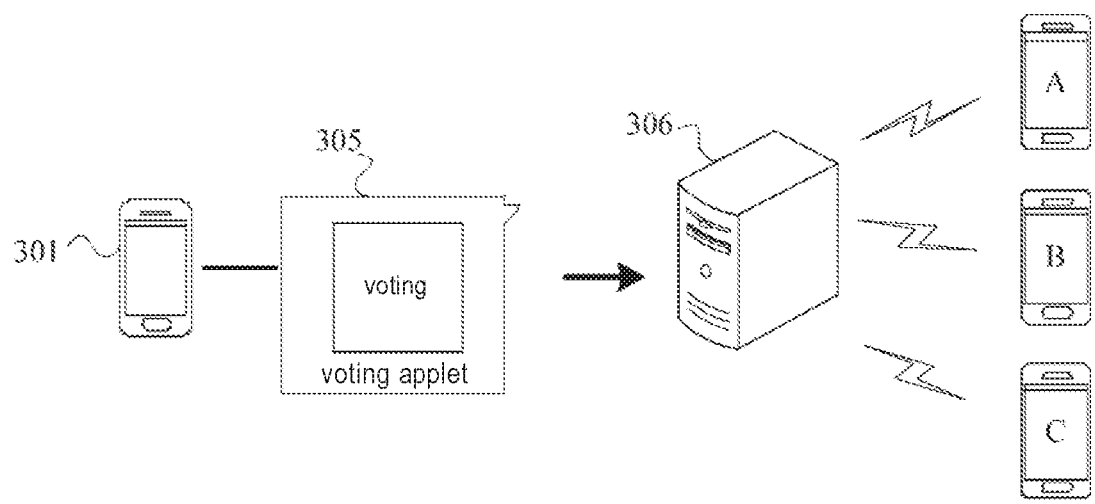
FIG. 3b is Schematic Diagram Two of an application scenario of a method for processing information according to an embodiment of the present disclosure.
Figure 3C:
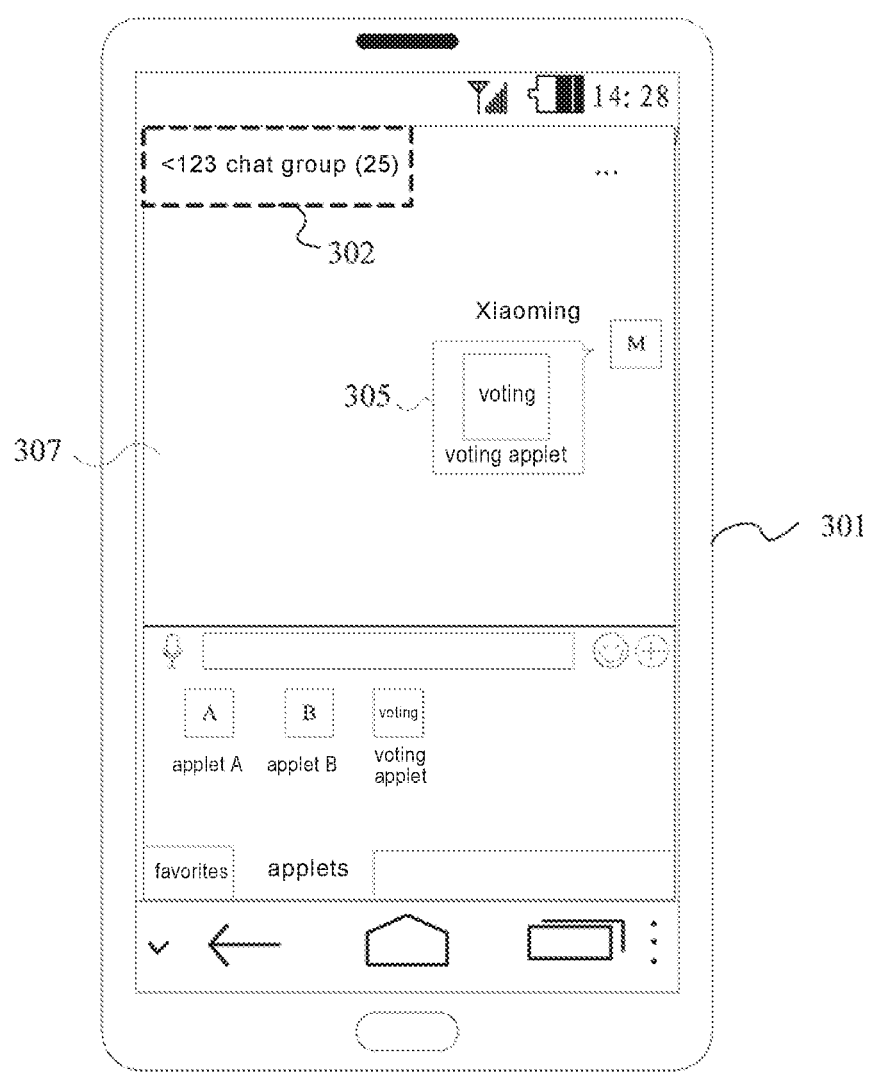
FIG. 3c is Schematic Diagram Three of an application scenario of a method for processing information according to an embodiment of the present disclosure.

Continued reference is made to FIGS. 3a to 3c. FIG. 3a is Schematic Diagram One of an application scenario of a method for processing information according to an embodiment of the present disclosure. In the application scenario of FIG. 3a, a client of a host application is installed on a mobile phone (as indicated by reference numeral 301). Applet A, applet B, and a voting applet (as indicated by reference numeral 304) are comprised in an applet set (as indicated by reference numeral 303) of a target chat session "123 chat group" (as indicated by reference numeral 302) of the host application.

If Xiaoming in the "123 chat group" clicks an identification image of the voting applet 304, then the client generate a chat message (as indicated by reference numeral 305) in connection with the identification image of the voting applet 304.

Afterwards, as shown in FIG. 3b, the client sends the chat message 305 to a server 306. The server 306 sends the chat message 305 to all users (user A, user B, and user C) in the "123 chat group" after receiving the chat message 305.

Then, as shown in FIG. 3c, the chat message 305 is displayed on an interface of the "123 chat group", and all group members in the 123 chat group are able to see the chat message 305 on a message display interface (as indicated by reference numeral 307) of the 123 chat group on their own mobile phones.

At present, when multiple users in a target chat session invoke a hosted application, usually each user can only invoke the hosted application from a client of his/her own terminal device individually. This leads to complicated operation of invoking hosted applications, which is disadvantageous to user's use in the target chat session. Rather, in the method provided in the above embodiment of the present disclosure, a client generates a chat message based on identification information of the triggered hosted application, and displays the chat message on an interface of the target chat session. Also, the client may send the chat message to the server, so that the server sends the chat message to user(s) in the target chat session, and the user(s) in the target chat session is able to see the chat message and thus operates the hosted application directly based on the chat message. This enables the user to use the hosted application as one functional control of the target chat session, which facilitates operating the hosted application through the target chat session of the host application.

Figure 4:
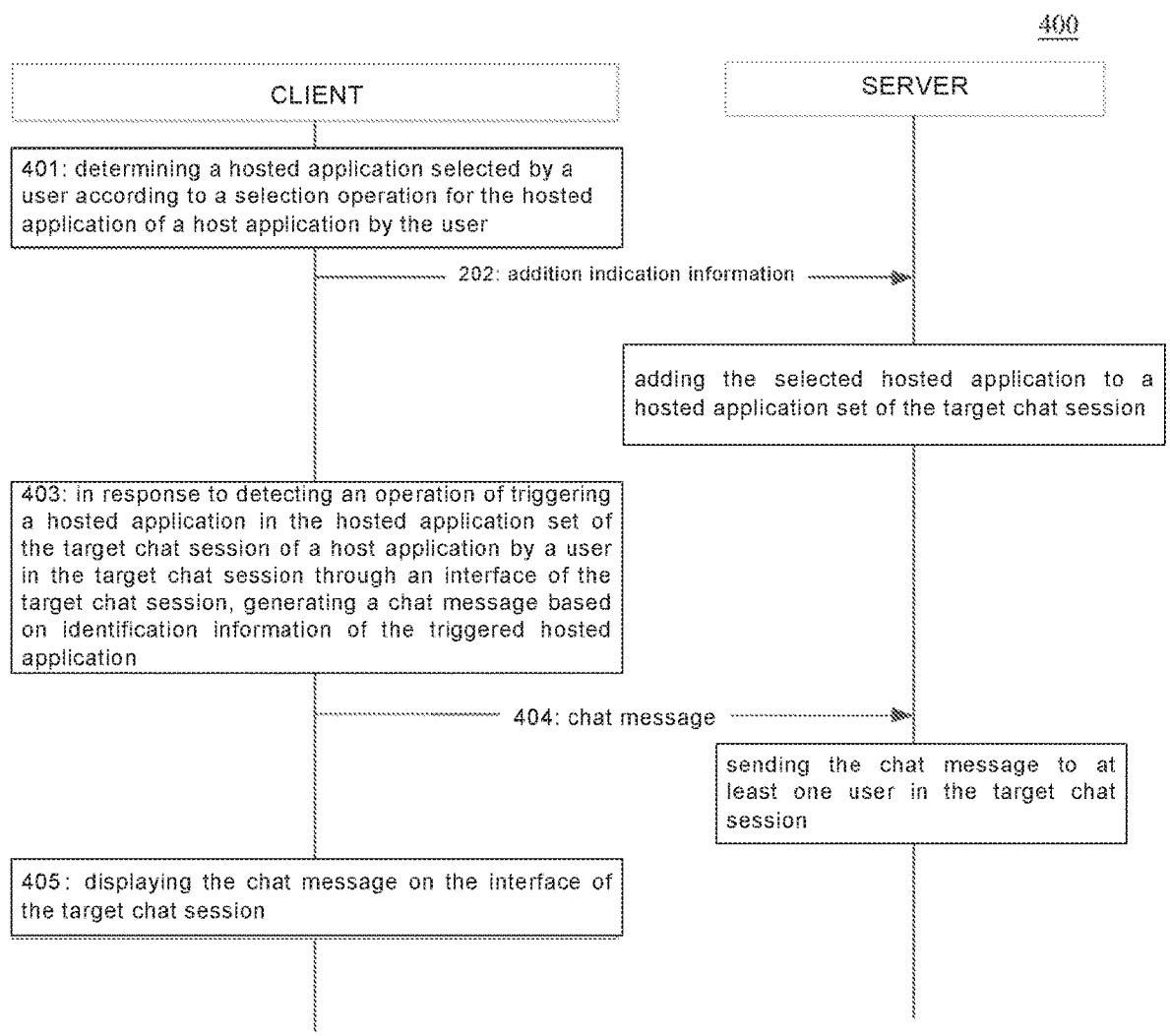
FIG. 4 is a flowchart of another embodiment of a method for processing information according to the present disclosure.

Further reference is made to FIG. 4, which shows a flow 400 of another embodiment of a method for processing information. The flow 400 of the method for processing information is implemented at a client and comprises the following steps.

Step 401, a hosted application selected by a user is determined according to a selection operation for the hosted application of a host application by the user.

In this embodiment, an entity performing the method for processing information (e.g., the terminal devices 101, 102, 103 shown in FIG. 1) may determine a hosted application selected by a user according to a selection operation for the hosted application of a host application by the user.

In one embodiment, when using the host application, the user may select its hosted application. The client may determine the specific hosted application selected by the user according to the selection operation of the user. For example, there may be 10 hosted applications for the host application. The user may select any one of the hosted applications therein. It should be noted that the user used herein may be a group owner or a general group member of the target chat session. This embodiment is not limited thereto.

Step 402, addition indication information for indicating that the selected hosted application is to be added to the hosted application set of the target chat session, is sent to the server, so that the server adds the selected hosted application to the hosted application set of the target chat session.

In this embodiment, if the hosted application selected by the user is determined, the above entity performing the method may send, to the server, addition indication information for indicating that the selected hosted application is to be added to the hosted application set of the target chat session. If the server receives the adding indication information, the server may add the selected hosted application to the hosted application set of the target chat session.

In this embodiment, the user can click a sign "+" of a message input toolbar in the target chat session to choose to add a hosted application. The user may also click an addition option for the hosted application to choose to add the hosted application to the hosted application set of the target chat session.

As an example, if a user wants to add a hosted application to a XX group of instant chat software, then the user may click an addition option for the hosted application "adding the hosted application to the XX group". A client of the instant chat software may obtain identification information of the hosted application. Afterwards, the client of the instant chat software may send, to the server, the identification information of the hosted application and group identification information of the XX group (such as a group account). After obtaining the identification information of the hosted application and the group account, the server adds the hosted application indicated by the identification information of the hosted application to a hosted application set of the XX group on a target user terminal in the XX group indicated by the group account, for example, to a message input toolbar on a terminal of the group owner.

In some implementations of this embodiment, the addition indication information is further used to indicate the server to send, to a client used by at least one user in the target chat session, information which characterizes that the selected hosted application is to be added to the local hosted application set. That is, after receiving the addition indication information, the server may not only add the selected hosted application to a hosted application set of the client of the group owner of the target chat session, but also add the selected hosted application to a hosted application set of a client of any user in the target chat session. For example, the selected hosted application may be added to a hosted application set of a client of each of the users in the target chat session, so that each of the users in the target chat session is able to see the selected hosted application in the hosted application set of the target chat session on his/her client.

Step 403, in response to detecting an operation of triggering a hosted application in the hosted application set of the target chat session of a host application by a user in the target chat session through an interface of the target chat session, a chat message is generated based on identification information of the triggered hosted application.

Step 404, the generated chat message is sent to a server, so that the server sends the chat message to at least one user in the target chat session.

Step 405, the chat message is displayed on the interface of the target chat session.

In this embodiment, the above step 403, step 404, and step 405 can be performed in a similar manner as step 201, step 202, and step 203 in the foregoing embodiment respectively. The foregoing descriptions for step 201, step 202, and step 203 can also apply to step 403, step 404, and step 405 respectively, and details are not described herein again.

In some implementations of this embodiment, if an operation of removing a selected hosted application from the hosted application set of the target chat session is detected, the above entity performing the method may send a remove request to the server. The server may remove the selected hosted application from the hosted application set of the target chat session after receiving the remove request.

Here, the target chat session may comprise group identification information and a group member identification information set. Here, the group member identification information set of the target chat session may comprise user identification information of a group owner and user identification information of group members. The user identification information of the group owner may refer to an account of the group owner.

As an example, if the group owner wants to remove the hosted application from the hosted application set of the target chat session, then he/she may press and hold an identification image of the hosted application in the hosted application set of the target chat session with his/her finger. A sign "x" would appear on the identification image of the selected hosted application. If the group owner clicks the sign, then the client may send a remove request to the server. The server may remove the hosted application from the hosted application set of the target chat session after receiving the remove request, so that the hosted application may be added to or removed from the hosted application set of the target chat session flexibly.

Compared with the embodiment corresponding to FIG. 2, it can be seen from FIG. 4 that the flow 400 of the method for processing information in this embodiment comprises the steps of: determining a hosted application selected by a user according to a selecting operation for the hosted application of a host application by the user, and sending, to the server, addition indication information for indicating that the selected hosted application is to be added to the hosted application set of the target chat session, so that the server adds the selected hosted application to the hosted application set of the target chat session. Thus, the solution described in this embodiment enables the hosted application to be added to the hosted application set of the target chat session of the host application, to serve as one functional control of the target chat session.

Figure 5:
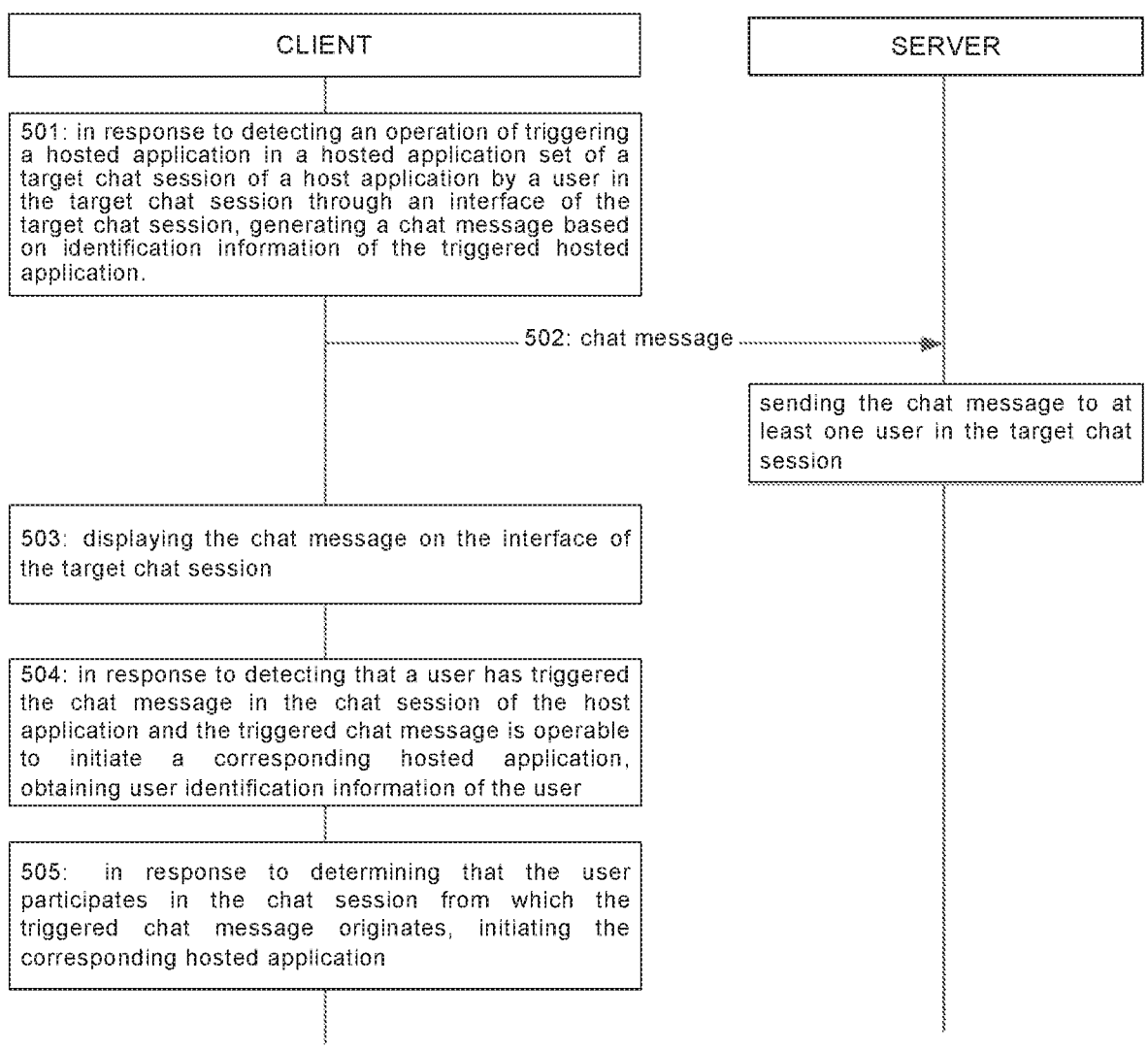
FIG. 5 is a flowchart of a further embodiment of a method for processing information according to the present disclosure.

Further reference is made to FIG. 5, which shows a flow 500 of a further embodiment of a method for processing information. The flow 500 of the method for processing information is implemented at a client and comprises the following steps.

Step 501, in response to detecting an operation of triggering a hosted application in a hosted application set of a target chat session of a host application by a user in the target chat session through an interface of the target chat session, a chat message is generated based on identification information of the triggered hosted application.

Step 502, the generated chat message is sent to a server, so that the server sends the chat message to at least one user in the target chat session.

Step 503, the chat message is displayed on the interface of the target chat session.

In this embodiment, the above step 501, step 502, and step 503 may be performed in a similar manner as step 201, step 202, and step 203 in the foregoing embodiment respectively. The foregoing descriptions for step 201, step 202, and step 203 can also apply to step 501, step 502, and step 503 respectively, and details are not described herein again.

Unlike the embodiment shown in FIG. 2, the method of this embodiment further comprises the following steps.

Step 504, in response to detecting that a user has triggered the chat message in the chat session of the host application and the triggered chat message is operable to initiate a corresponding hosted application, user identification information of the user is obtained.

In this embodiment, if it is detected that a user has triggered the chat message in the chat session of the host application and the triggered chat message is operable to initiate a corresponding hosted application, an entity performing the method for processing information (e.g., the terminal devices 101, 102, 103 shown in FIG. 1) may obtain user identification information of the user.

As an example, after a chat message including hosted application a is displayed in the target chat session, user A in the target chat session forwards the chat message to user B. Then user A and user B will reconstruct a chat session. At this time, if it is detected that user B has triggered the chat message, then a client of the host application obtains identification information of user B. The identification information of user B may be an account of user B.

Step 505, in response to determining that the user participates in the chat session from which the triggered chat message originates, the corresponding hosted application is initiated.

In this embodiment, after obtaining the identification information of the user, the above entity performing the method may determine whether the user indicated by the identification information is a group member of the target chat session. That is, the above entity performing the method may determine whether the user participates in the chat session from which the triggered chat message originates. It should be noted here that this determination step may be performed by the above entity performing the method, or may be performed by the server. This embodiment is not limited thereto.

For example, the above entity performing the method may obtain a group member identification information set of the target chat session at first. The group member identification information set comprises identification information of all group members. Then, the above entity performing the method may look up group member identification information from the group member identification information set one by one, to determine whether the group member identification information which is identical to the identification information of the user exists in the group member identification information set. If yes, then it is proved that the user participates in the chat session from which the triggered chat message originates. If no, then it is proved that the user does not participate in the chat session from which the triggered chat message originates.

In this embodiment, if the user indicated by the user identification information participates in the chat session from which the triggered chat message originates, then the above entity performing the method may initiate the hosted application corresponding to the chat message. That is, the above entity performing the method may permit the user to operate the hosted application. At this time, the client may initiate the hosted application.

In some implementations of this embodiment, if the user indicated by the user identification information does not participate in the chat session from which the triggered chat message originates, then the above entity performing the method may generate prompt information for characterizing that the hosted application corresponding to the chat message cannot be initiated.

As an example, if the client determines that user B is not a group member of the target chat session, then it is proved that user B is unable to operate the hosted application in the target chat session. At this time, the client may generate prompt information "Sorry, you have no permission to use" to prompt user B that the hosted application cannot be operated by way of forwarding, so that the hosted application is used as one functional control of the target chat session, and cannot be operated by any user who does not belong to the target chat session. This enables the hosted application to better match the target chat session.

In some implementations of this embodiment, if it is determined that the user participates in the chat session from which the triggered chat message originates, the above entity performing the method may initiate the corresponding application program. Afterwards, the above entity performing the method may obtain the information which is input by the user through an interface of the initiated corresponding hosted application. Then, the above entity performing the method may update the triggered chat message in connection with the inputted information and identification information of the triggered hosted application, and obtain an updated chat message.

Afterwards, the above entity performing the method may send the updated chat message to the server. After receiving the updated message, the server may send the updated chat message to at least one user in the chat session corresponding to the triggered chat message. In this way, the chat message which comprises the hosted application and is displayed on the interface of the target chat session will be continuously updated with the information which is input by the user.

In some implementations of this embodiment, after the chat message is generated, the above entity performing the method may also send permission indication information to the triggered hosted application. The permission indication information is used to characterize a range of user information of the user that is permitted to be obtained by the triggered hosted application.

Here, the client may set the range of the user information of the user that is permitted to be obtained by the triggered hosted application. For example, the client may set that the triggered hosted application is permitted to obtain account information, gender information of the user, and information which is input by the user, and that the triggered hosted application is not permitted to obtain other information. Then the client sends the permission indication information to the triggered hosted application. This can guarantee that the triggered hosted application cannot steal user's privacy at liberty, thus improving user security of using the hosted application.

In one embodiment, the above entity performing the method may also send the permission indication information to the server. That is, the above permission indication information may be sent by the client to the triggered hosted application directly. In one embodiment, the client may send the permission indication information to the server first. Afterwards, the server sends the permission indication information to the triggered hosted application. This embodiment is not limited thereto.

Compared with the embodiment corresponding to FIG. 2, it can be seen from FIG. 5 that the flow 500 of the method for processing information in this embodiment implements the steps of: in response to detecting that a user has triggered the chat message in the chat session of the host application and the triggered chat message is operable to initiate a corresponding hosted application, obtaining user identification information of the user, and in response to determining that the user participates in the chat session from which the triggered chat message originates, initiating the corresponding hosted application. Thus, the solution described in this embodiment enables the hosted application in the hosted application set of the target chat session to be used as one functional control of the target chat session, and limits the scope of use of the hosted application, so that the hosted application better matches the target chat session.

Figure 6:
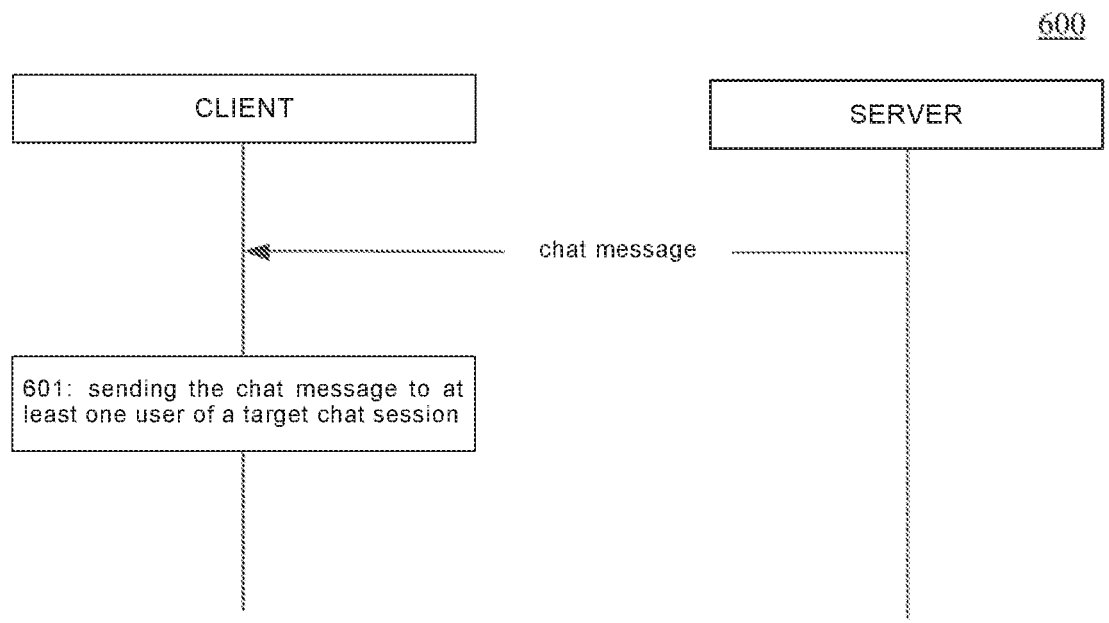
FIG. 6 is a flowchart of a yet further embodiment of a method for processing information according to the present disclosure.

With continued reference to FIG. 6, a flow 600 of another embodiment of a method for processing information according to the present disclosure is shown. The method for processing information is implemented at a server and comprises the following steps.

Step 601, in response to receiving a chat message sent by a client of a user in a target chat session of a host application served by the server, the chat message is sent to at least one user in the target chat session.

In this embodiment, if a chat message sent by a client of a user in a target chat session of the host application served by the server is received, an entity performing the method for processing information (e.g., the server 105 shown in FIG. 1) may send the chat message to at least one user in the target chat session. In one embodiment, the server may send the chat message to all users in the target chat session. In this way, all of the users in the target chat session are enabled to receive the chat message.

The chat message is generated by the client of the user based on identification information of a hosted application in a hosted application set of the target chat session which is triggered by the user through an interface of the target chat session. The chat message is operable to initiate the hosted application.

The specific content of the host application and the hosted application used herein can be made reference to the specific descriptions of the embodiment shown in FIG. 2, and details are not described herein again.

The identification information used herein may be an identification image of the hosted application, QR code information of the hosted application, or link information of the hosted application.

In some implementations of this embodiment, if addition indication information which is sent by a client of a user in a target chat session of the host application served by the server and is used to indicate the server to add a hosted application selected by the user to a hosted application set of the target chat session is received, the above entity performing the method may add the hosted application selected by the user to the hosted application set of the target chat session.

As an example, if a user in a XX group of instant chat software triggers an option on applet for adding to the XX group, then the applet may send its link information to a client of the XX group. The applet may also send an identification image comprising its link information to the client of the XX group. Then, the client sends addition indication information to the server. The server adds the link information or the identification image of the applet to an applet set of the XX group on a user terminal of the user.

In one embodiment, the client may also send, to the server, addition indication information for indicating the sever to send, to a client used by at least one user in the target chat session, information which characterizes that a selected hosted application is to be added to a local hosted application set. The server may, for example, send the addition indication information to clients of all users in the target chat session after receiving the addition indication information.

If the server receives information indicating that the addition request is accepted by the clients of all user, then the server may add the hosted application to the local hosted application set of each user, so that each user in the target chat session is able to see the hosted application on his/her interface of the target chat session, and the hosted application can be used as one functional control of the target chat session by the user in the target chat session.

In some implementations of this embodiment, if detection information, which is sent by a client of a user and characterizes that the user has triggered a chat message in a chat session of the host application and the triggered chat message is operable to initiate a corresponding hosted application, is received, then the above entity performing the method may obtain user identification information of the user. Here, the user identification information may comprise an account of the user.

Then, after obtaining the user identification information of the user, the server may look up group member identification information from a group member identification information set of the target chat session one by one, to determine whether the group member identification information which is identical to the identification information of the user exists in the group member identification information set. If yes, then it is proved that the user participates in the chat session from which the triggered chat message originates. If no, then it is proved that the user does not participate in the chat session from which the triggered chat message originates.

If the user indicated by the user identification information participates in the chat session from which the triggered chat message originates, then the server may send, to the client of the user, first indication information which permits the client to initiate the hosted application corresponding to the chat message. That is, the above entity performing the method may permit the user to operate the hosted application.

In one embodiment, if the user indicated by the user identification information does not participate in the chat session from which the triggered chat message originates, then the server may generate second indication information for characterizing that the hosted application corresponding to the chat message cannot be initiated. In one embodiment, the second indication information may be: "Sorry, you have no permission to use".

In some implementations of this embodiment, if information which is sent by a client of a user and is input by the user through an interface of the initiated corresponding hosted application is received, the above entity performing the method may also update the triggered chat message in connection with the inputted information and identification information of the triggered hosted application, and then obtain an updated chat message.

If the server obtains the updated chat message, it sends the updated chat message to the client of the user. The server may also send the updated chat message to at least one user in the chat session corresponding to the triggered chat message.

In one embodiment, a chat message appears in a message interface of a chat session. User A clicks the chat message to initiate hosted application a. Then, user A inputs information on an interface of hosted application a. The server regenerates a chat message in connection with the information input by user A and the identification information of the hosted application. Then, the server may send the regenerated chat message to a client of user A. The server may also send the regenerated chat message to clients of all users in the chat session, which enables all of the users in the chat session to receive the regenerated chat message.

In some implementations of this embodiment, if permission indication information sent by a client of a user in the target chat session of the host application served by the server is received, the above entity performing the method may send the permission indication information to the triggered hosted application. The permission indication information used herein is used to characterize a range of user information of the user that is permitted to be obtained by the triggered hosted application.

In some implementations of this embodiment, if a remove request sent by a client of a user in the target chat session of the host application served by the server is received, the above entity performing the method may remove the hosted application selected by the user from a hosted application set of the target chat session.

As an example, if a group owner wants to remove the hosted application from the hosted application set of the target chat session, then he/she may press and hold an identification image of the hosted application in the hosted application set of the target chat session with his/her finger. A sign "x" would appear on the identification image of the selected hosted application. If the group owner clicks the sign, then the client may send a remove request to the server. The server may remove the hosted application from the hosted application set of the target chat session after receiving the remove request, so that the server may add or remove the hosted application to or from the target chat session flexibly.

The method for processing information of the above embodiment of the present disclosure comprises: in response to receiving a chat message sent by a client of a user in a target chat session of a host application served by the server, sending the chat message to at least one user in the target chat session. The chat message is generated by the client of the user based on identification information of a hosted application in a hosted application set of the target chat session which is triggered by the user through an interface of the target chat session. The chat message is operable to initiate the hosted application, so that the hosted application can be used as an added control affiliated to the target chat session, and also can be sent to users in the target chat session as a chat message.

Figure 7:
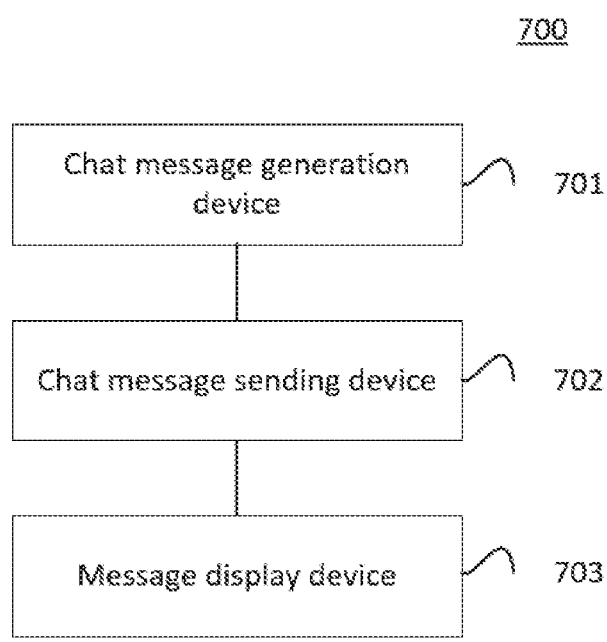
FIG. 7 is a schematic structural diagram of an embodiment of an apparatus for processing information according to the present disclosure.

With further reference to FIG. 7, as an implementation of the methods shown in the foregoing figures, the present disclosure provides an embodiment of an apparatus for processing information. This apparatus embodiment corresponds to the method embodiment shown in FIG. 2, and the apparatus can be In one embodiment implemented at terminal devices.

As shown in FIG. 7, the apparatus 700 for processing information provided in this embodiment comprises a chat message generation device 701, a chat message sending device 702, and a message display device 703. The chat message generation device 701 is configured to: in response to detecting an operation of triggering a hosted application in a hosted application set of a target chat session of a host application by a user in the target chat session through an interface of the target chat session, generate a chat message based on identification information of the triggered hosted application. The chat message sending device 702 is configured to: send the generated chat message to a server, so that the server sends the chat message to at least one user in the target chat session, and the chat message is operable to be triggered to initiate the triggered hosted application, and the hosted application runs with dependence on the host application. The message display device 703 is configured to: display the chat message on the interface of the target chat session.

In this embodiment, the specific processing of the chat message generation device 701, the chat message sending device 702, and the message display device 703 in the apparatus 700 for processing information can be made reference to the related descriptions of step 201, step 202, and step 203 in the embodiment corresponding to FIG. 2 respectively, and details are not described herein again.

In the apparatus for processing information in the above embodiment of the present disclosure, the client generates a chat message via the chat message generation device 701 based on identification information of the triggered hosted application. The message display device 703 displays the chat message on an interface of the target chat session. Also, the chat message sending device 702 may be also configured to send the chat message to the server, so that the server sends the chat message to user(s) in the target chat session. In this way, the user(s) in the target chat session is able to see the chat message and thus operate the hosted application based on the chat message directly. This enables the hosted application to be used as one functional control of the target chat session, which facilitates operating the hosted application through the target chat session of the host application.

Figure 8:
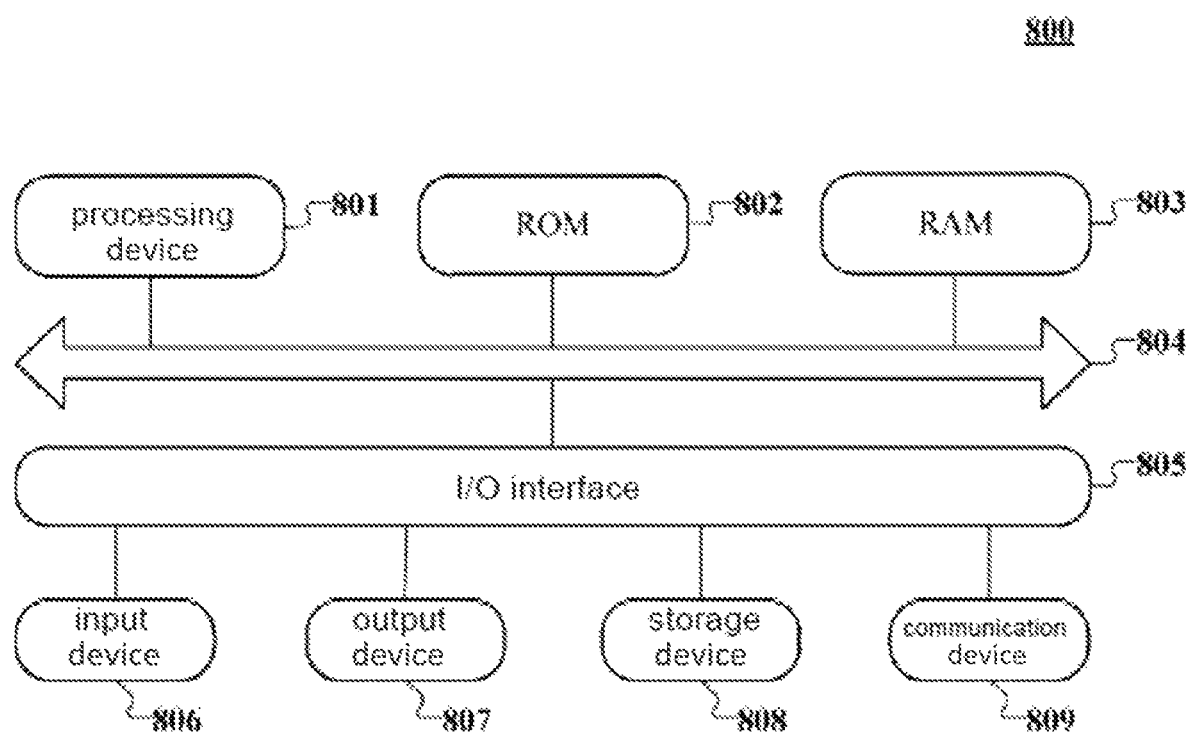
FIG. 8 is a schematic structural diagram of an electronic device suitable for implementing some embodiments of the present disclosure.

Reference is now made to FIG. 8, which shows a schematic structural diagram of an electronic device 800 (such as terminal devices in FIG. 1) suitable for implementing embodiments of the present disclosure. The electronic device in the embodiments of the present disclosure may include but is not limit to: a mobile terminal such as a mobile phone, a laptop, a digital broadcast receiver, a PDA (personal digital assistant), a PAD (a tablet), a PMP (portable multimedia player), a vehicle-mounted terminal (e.g., a vehicle-mounted navigation terminal) and a fixed terminal such as a digital TV, a desktop computer. The electronic device shown in FIG. 8 is merely an example, and should not impose any limitation on the functions and scope of use of the embodiments of the present disclosure.

As shown in FIG. 8, the electronic device 800 may include a processing means (such as a central processor, a graphic processor) 801, which can perform various appropriate actions and processing according to the programs stored in a read-only memory (ROM) 802 or programs loaded from a storage means 808 into a random access memory (RAM) 803. Various programs and data necessary for the operations of the electronic device 800 are also stored in RAM 803. Processing means 801, ROM 802, and RAM 803 are connected to each other via a bus 804. An input/output (I/O) interface 805 is also connected to the bus 804.

Generally, the following means may be connected to the I/O interface 805: an input means 806 including for example a touch screen, a touch panel, a keyboard, a mouse, a camera, a microphone, an accelerometer and a gyroscope, etc.; an output means 807 including for example a Liquid Crystal Display (LCD), a speaker and a vibrator, etc.; the storage means 808 including for example a cassette, a hard disk, etc.; and a communication means 809. The communication means 809 may permit the electronic device 800 to conduct wireless or wired communication with other devices to exchange data. While FIG. 8 shows an electronic device 800 with various means, it should be understood that it is not required to implement or provide all the means shown. More or fewer means may be implemented or provided instead. Each block shown in FIG. 8 may represent one means, or may represent multiple means as needed.

In particular, according to the embodiments of the present disclosure, the processes described above with reference to the flowcharts may be implemented as computer software programs. Embodiments of the present disclosure include a computer program product including a computer program carried on a computer-readable medium, the computer program containing program code for performing a method shown in a flowchart. In such embodiments, the computer program may be downloaded and installed via a network through the communication means 809, or installed from the storage means 808, or installed from the ROM 802. The computer program, when executed by the processing means 801, performs the above functions defined in the method of the embodiments of the present disclosure.

It should be noted that the computer-readable medium described in the embodiments of the present disclosure may be a computer readable signal medium or a computer readable storage medium or any combination of the above two. The computer-readable storage medium may be, for example, but not limited to, an electronic, magnetic, optical, electromagnetic, infrared, or semiconductor system, apparatus, or device, or any combination thereof. More specific examples of a computer-readable storage medium may include, but are not limited to: electrical connections with one or more wires, portable computer magnetic disks, hard disks, random access memory (RAM), read-only memory (ROM), erasable Programming read-only memory (EPROM or flash memory), optical fiber, portable compact disk read-only memory (CD-ROM), optical storage device, magnetic storage device, or any suitable combination of the foregoing. In the embodiments of the present disclosure, a computer-readable storage medium may be any tangible medium that contains or stores a program that can be used by or in combination with an instruction execution system, apparatus, or device. In the embodiments of the present disclosure, a computer-readable signal medium may include a data signal that is included in a baseband or propagated as part of a carrier wave, and which carries computer-readable program code. Such a propagated data signal may take many forms, including but not limited to electromagnetic signals, optical signals, or any suitable combination of the foregoing. A computer-readable signal medium may also be any computer-readable medium other than a computer-readable storage medium, and the computer-readable signal medium may send, propagate, or transmit a program for use by or in connection with an instruction execution system, apparatus, or device. Program code embodied on a computer-readable medium may be transmitted using any appropriate medium, including but not limited to: wired, optical fiber cable, RF, etc., or any suitable combination of the foregoing.

The above computer-readable medium may be contained in the above electronic device; or may exist alone, instead of being assembled into the terminal device. The above computer-readable medium carries one or more programs. When the above one or more programs are executed by the terminal device, the terminal device is caused to: in response to detecting an operation of triggering a hosted application in a hosted application set of a target chat session of a host application by a user in the target chat session through an interface of the target chat session, generate a chat message based on identification information of the triggered hosted application; send the generated chat message to a server, so that the server sends the chat message to at least one user in the target chat session, and the chat message is operable to be triggered to initiate the triggered hosted application, and the hosted application runs with dependence on the host application; and display the chat message on the interface of the target chat session.

Computer program code for performing the operations of the embodiments of the present disclosure may be written in one or more programming languages, or a combination thereof, including object oriented programming languages such as Java, Smalltalk, C++, and conventional procedural programming language, such as "C" or similar programming language. The program code can be executed entirely on the user's computer, partly on the user's computer, as an independent software package, partly on the user's computer and partly on a remote computer, or entirely on a remote computer or server. In the case of a remote computer, the remote computer can be connected to the user's computer through any kind of network, including a local area network (LAN) or wide area network (WAN), or it can be connected to an external computer (for example through Internet connection provided by an Internet service provider).

What is claimed is:
1. A method, implemented at a client, for processing information, comprising:
    in response to an operation of selecting a hosted application of a host application by a user, determining the hosted application selected by the user;
    sending, to a server addition indication information for indicating the server to add the selected hosted application to a hosted application set of a target chat session of the host application, so that the server adds the selected hosted application to the hosted application set of the target chat session;
    in response to detecting an operation of triggering the hosted application in the hosted application set of the target chat session by the user in the target chat session through an interface of the target chat session, generating a chat message based on identification information of the triggered hosted application;

sending the generated chat message to the server, so that the server sends the chat message to at least one user in the target chat session, wherein the chat message is operable to be triggered to initiate the triggered hosted application, and wherein the hosted application runs with dependence on the host application; and displaying the chat message on the interface of the target chat session.

2. The method according to claim 1, wherein the addition indication information is further used to indicate the server to send, to a client used by at least one user in the target chat session, information which characterizes that the selected hosted application is to be added to a local hosted application set.

3. The method according to claim 1, wherein the step of generating the chat message based on the identification information of the triggered hosted application, comprising:

initiating the hosted application triggered by the user;

obtaining information which is input by the user through an interface of the initiated hosted application; and generating the chat message based on the inputted information and the identification information of the triggered hosted application, wherein the chat message comprises the identification information of the triggered hosted application.

4. The method according to claim 1, wherein the step of generating the chat message based on the identification information of the triggered hosted application, comprising:

generating the chat message based on the identification information of the triggered hosted application and session identification information of the target chat session, wherein the chat message comprises the identification information of the triggered hosted application and the session identification information of the target chat session.

5. The method according to claim 1, wherein the method further comprising:

in response to detecting that the user has triggered the chat message in a chat session of the host application and the triggered chat message is operable to initiate a corresponding hosted application, obtaining user identification information of the user; and in response to determining that the user participates in the chat session from which the triggered chat message originates, initiating the corresponding hosted application.

6. The method according to claim 5, wherein after the step of obtaining the user identification information of the user, the method further comprising:

in response to determining that the user does not participate in the chat session from which the triggered chat message originates, generating prompt information for characterizing that the corresponding hosted application cannot be initiated.

7. The method according to claim 5, wherein the method further comprising:

obtaining information which is input by the user through an interface of the initiated corresponding hosted application;

updating the triggered chat message based on the inputted information and the identification information of the triggered hosted application, and obtaining an updated chat message; and sending the updated chat message to the server, so that the server sends the updated chat message to at least one user in the chat session corresponding to the triggered chat message.

8. The method according to claim 1, wherein after the step of generating the chat message based on the identification information of the triggered hosted application, the method further comprising:

in response to detecting an operation of triggering the chat message by the user, sending permission indication information to the triggered hosted application, wherein the permission indication information is used to characterize a range of user information of the user that is permitted to be obtained by the triggered hosted application.

9. The method according to claim 1, wherein after the step of generating the chat message based on the identification information of the triggered hosted application, the method further comprising:

in response to detecting the operation of triggering the chat message by the user, sending permission indication information to the server, so that the server forwards the permission indication information to the triggered hosted application, wherein the permission indication information is used to characterize a range of user information of the user that is permitted to be obtained by the triggered hosted application.

10. The method according to claim 1, wherein, after the step of sending, to the server, addition indication information for indicating the server to add the selected hosted application to the hosted application set of the target chat session, so that the server adds the selected hosted application to the hosted application set of the target chat session, the method further comprising:

in response to detecting an operation of removing the selected hosted application from the hosted application set of the target chat session by the user, sending a remove request to the server, so that the server removes the selected hosted application from the hosted application set of the target chat session.

11. A method, implemented at a server, for processing information, comprising:

in response to receiving addition indication information which is sent by a client of a user in a target chat session of a host application served by the server and indicates the server to add a hosted application which is determined by the client in response to an operation of selecting the hosted application of the host application by the user to a hosted application set of the target chat session, adding the hosted application selected by the user to the hosted application set of the target chat session;

in response to receiving a chat message sent by the client of the user in the target chat session, sending the chat message to at least one user in the target chat session, wherein the chat message is generated by the client of the user based on identification information of the hosted application in the hosted application set of the target chat session which is triggered by the user through an interface of the target chat session, and wherein the chat message is operable to initiate the hosted application.

12. The method according to claim 11, wherein the addition indication information is further used to indicate the server to send, to a client used by at least one user in the target chat session, information which characterizes that the selected hosted application is to be added to a local hosted application set, the method further comprising:

sending, to the client used by the at least one user in the target chat session, the addition indication information which characterizes that the selected hosted application is to be added to a local hosted application set.

13. The method according to claim 11, wherein the method further comprising:
in response to receiving detection information which is sent by the client of the user and characterizes that the user has triggered a chat message in a chat session of the host application and the triggered chat message is operable to initiate a corresponding hosted application, obtaining user identification information of the user;
determining whether the user indicated by the user identification information participates in the chat session from which the triggered chat message originates; and
in response to determining that the user participates in the chat session from which the triggered chat message originates, sending, to the client of the user, first indication information which permits the client of the user to initiate the corresponding hosted application.

14. The method according to claim 13, wherein after the step of determining whether the user indicated by the user identification information participates in the chat session from which the triggered chat message originates, the method further comprising:
in response to determining that the user does not participate in the chat session from which the triggered chat message originates, sending, to the client of the user, second indication information for characterizing that the corresponding hosted application cannot be initiated.

15. The method according to claim 13, wherein the method further comprising:
in response to receiving information which is sent by the client of the user and is input by the user through an interface of the initiated corresponding hosted application, updating the triggered chat message based on the inputted information and the identification information of the triggered hosted application, obtaining an updated chat message, and sending the updated chat message to the client of the user; and
sending the updated chat message to at least one user in the chat session corresponding to the triggered chat message.

16. The method according to claim 11, wherein the method further comprising:
in response to receiving permission indication information sent by the client of the user in the target chat session of the host application served by the server, sending the permission indication information to the triggered hosted application, wherein the permission indication information is used to characterize a range of user information of the user that is permitted to be obtained by the triggered hosted application.

17. The method according to claim 11, wherein the method further comprising:
in response to receiving a remove request sent by the client of the user in the target chat session of the host application served by the server, removing the hosted application selected by the user from the hosted application set of the target chat session.

18. An electronic device, comprising:
one or more processors;
a storage device having one or more programs stored thereon;
the one or more programs, when executed by the one or more processors, causing the one or more processors to implement the following:
in response to an operation of selecting a hosted application of a host application by a user, determining the hosted application selected by the user;
sending, to a server, addition indication information for indicating the server to add the selected hosted application to a hosted application set of a target chat session of the host application, so that the server adds the selected hosted application to the hosted application set of the target chat session;
in response to detecting an operation of triggering the hosted application in the hosted application set of the target chat session by the user in the target chat session through an interface of the target chat session, generating a chat message based on identification information of the triggered hosted application;
sending the generated chat message to the server, so that the server sends the chat message to at least one user in the target chat session, wherein the chat message is operable to be triggered to initiate the triggered hosted application, and wherein the hosted application runs with dependence on the host application; and
displaying the chat message on the interface of the target chat session.

* * * * *